(12) United States Patent
Norton et al.

(10) Patent No.: US 8,647,696 B2
(45) Date of Patent: Feb. 11, 2014

(54) LOW FAT FOOD CONTAINING GAS BUBBLES

(75) Inventors: Ian Timothy Norton, Birmingham (GB); Philip William Cox, Birmingham (GB); Fideline Laure Tchuenbou-Magaia, Birmingham (GB)

(73) Assignee: The University of Birmingham, Birmingham (GB)

( * ) Notice: Subject to any disclaimer, the term of this patent is extended or adjusted under 35 U.S.C. 154(b) by 165 days.

(21) Appl. No.: 13/133,099

(22) PCT Filed: Dec. 9, 2009

(86) PCT No.: PCT/GB2009/002839
§ 371 (c)(1),
(2), (4) Date: Aug. 2, 2011

(87) PCT Pub. No.: WO2010/067059
PCT Pub. Date: Jun. 17, 2010

(65) Prior Publication Data
US 2011/0287150 A1 Nov. 24, 2011

(30) Foreign Application Priority Data

Dec. 12, 2008 (GB) .................................. 0822707.6
Jun. 12, 2009 (GB) .................................. 0910139.5

(51) Int. Cl.
*A23D 7/00* (2006.01)
(52) U.S. Cl.
USPC .............................. 426/602; 426/564; 426/312
(58) Field of Classification Search
USPC ........................................................ 426/602
See application file for complete search history.

(56) References Cited

U.S. PATENT DOCUMENTS

| | | | |
|---|---|---|---|
| 5,171,603 A | 12/1992 | Singer et al. | |
| 6,048,565 A * | 4/2000 | Getler et al. | 426/583 |
| 6,579,557 B1 * | 6/2003 | Benjamins et al. | 426/603 |
| 6,770,317 B2 * | 8/2004 | Takahashi et al. | 426/586 |
| 8,101,225 B2 * | 1/2012 | Bialek et al. | 426/564 |
| 2007/0116848 A1 * | 5/2007 | Aldred et al. | 426/564 |
| 2008/0175972 A1 * | 7/2008 | Cox et al. | 426/565 |
| 2009/0142467 A1 * | 6/2009 | Aldred et al. | 426/572 |
| 2010/0189857 A1 * | 7/2010 | Blijdenstein et al. | 426/329 |

FOREIGN PATENT DOCUMENTS

| | | |
|---|---|---|
| EP | 0359246 A2 | 3/1990 |
| EP | 0885615 A1 | 12/1998 |
| EP | 1938697 A1 | 7/2008 |
| GB | 2078483 A | 6/1980 |
| JP | 7-16061 | 1/1995 |
| WO | WO94/12063 | 6/1994 |
| WO | WO00/38547 | 12/1998 |
| WO | WO 00/38547 | 7/2000 |
| WO | WO 02/060283 A2 | 8/2002 |
| WO | WO02/060283 A2 | 8/2002 |
| WO | WO 03/053174 A1 | 7/2003 |
| WO | WO03/053174 A1 | 7/2003 |

OTHER PUBLICATIONS

Great Britian Search Report dated Apr. 8, 2009.
Great Britain Search Report dated Oct. 19, 2009.
Emulsion Technology, Lecture 6, ACS, 2005 dated Jul. 29, 2013.
D. Swern (ed.), Bailey's Industrial Oil and Fat Products, vol. 2, Fourth Edition, Wiley, New York, 1982, pp. 315, 332, 333.
Y. H. Hui (ed.), Encyclopedia of Food Science and Technology, vol. 2, Wiley, New York, 1992. p. 690-691.
J. Schormuller (ed.), Handbuch der Lebensmittelchemie, Band IV, Feete and Lipoide (Lipids), Springer, Berlin, 1969, p. 1006-1012.
R. G. Jensen (ed.), Handbook of Milk Composition, Academic Press, London, UK, 1995, p. 464-466.
F. W. Soluski et al., J. Agric. Food Chem. 1990, 38, 1351-1356.
N. L. Kent et al., Kent's Technology of Cereals, Fourth Edition, Elsevier Science, Oxford, UK, 1994, p. 26, 280.
Papers submitted in opposition of corresponding European patent, 2013.

* cited by examiner

*Primary Examiner* — Carolyn Paden
(74) *Attorney, Agent, or Firm* — Berliner & Associates

(57) ABSTRACT

The invention discloses a shelf stable food product. The product comprises a continuous aqueous phase, liquid oil droplets dispersed in the continuous aqueous phase, and protein coated gas bubbles. The continuous aqueous phase constitutes from 20% to 80% by volume (or weight) of the food product and the liquid oil droplets and protein coated gas bubbles are from 0.5 μm to 10 μm in diameter. The protein comprises cysteine amino acid residues, but is not a hydrophobin. The invention also discloses a method of forming an aqueous dispersion of protein coated gas bubbles suitable for forming the above food product. The method comprises dissolving a protein capable of forming coated gas bubbles in water with stirring, sonicating the protein solution at a temperature below but within 6° C. of the protein's denaturation temperature in the presence of oxygen, and controlling the temperature within these limits. Any protein debris from the resultant dispersion of protein coated gas bubbles is separated out.

7 Claims, No Drawings

LOW FAT FOOD CONTAINING GAS BUBBLES

BACKGROUND OF THE INVENTION

The present invention relates to a shelf stable food product, particularly but not exclusively a low fat food product, having a continuous aqueous phase with oil droplets and protein coated gas bubbles dispersed therein and a method for making the same and in.

Particularly in the West, obesity is a major cause for concern. Health conscious consumers are increasingly looking for products that have low fat and calorific content. However, they are often not prepared to accept healthier alternatives that have poor (or even different) taste and/or texture to the traditional products. Thus, food manufacturers face the problem of making low fat alternatives to some of the consumers' favourite products such as desserts, cooking sauces and salad dressings that not only taste as good but that also give the same texture and sensation in the mouth when eaten. Fat plays and important role in giving products their distinctive texture as well as taste. Although fat can be removed and/or substituted to produce a healthier product, if it does not have the same organoleptic properties as the equivalent "full fat" alternative it may not meet with customer acceptance. Moreover, many consumers are not prepared to pay a premium for a low fat alternative, it therefore being important that any new products can be manufactured in a cost effective manner.

Many fat containing food products such as sandwich spreads, soft cheeses, sauces and mayonnaises are emulsions of fat in water (having either a continuous water phase i.e. oil-in-water emulsions or a continuous fat phase i.e. water-in-oil emulsions).

It is known from EP1938697 that a class of proteins found in fungi called hydrophobins can be used to stabilise foams in aerated food products. Once hydrophobins are located at the interface they spontaneously aggregate to create a two-dimensional network. This network then allows air cells to behave as if they are oil droplets, thus producing what might be called an air filled emulsion, however, the application of hydrophobins in food products has been limited by their high cost. In addition, the hydrophobins spontaneously form into aggregate once at the interface which means that the production of the air pockets is uncontrollable. During the production process the hydrophobin aggregates can be knocked from the interface and become inactive, allowing the air pockets to break up thereby altering the formulation of the final product.

The use of air cells in food products is also described in WO 00/038547 where the air cells are used in the water phase of oil with water emulsions to equalise the density of the water and oil phases to prevent separation of the water phase. The air cells also reduce the tendency of the oil with water emulsions to spatter when used in shallow frying by providing nucleation sites for evaporation of the water phase.

SUMMARY OF THE INVENTION

There is a need for a low cost alternative to hydrophobins that provides a stabile gaseous phase for fat replacement in food products with the required shelf life and a texture and mouth sensation comparable with the traditional products.

It is an object of the present invention to provide a product and method which obviate or mitigate the prior art problems

DETAILED DESCRIPTION OF THE INVENTION

According to a first aspect of the present invention there is provided a shelf stable food product comprising:

a continuous aqueous phase,
liquid oil droplets dispersed in the continuous aqueous phase, and
protein coated gas bubbles, wherein the continuous aqueous phase constitutes from 20% to 80% by volume of the food product and the liquid oil droplets and protein coated gas bubbles are from 0.5 µm to 10 µm in diameter and wherein the protein comprises cysteine amino acid residues, but is not a hydrophobin.

In certain embodiments, the continuous aqueous phase constitutes 20% to 80% by weight, not volume, of the food product.

It will be appreciated that the gas bubbles are structured to replicate certain properties of fat particles and to replace a part of the fat content of the full-fat equivalent of the food product.

The gas bubbles are constructed by forming a protein shell around a normally short-lived gas cell produced during the sonication process. The protein shell formation is driven by the concentration of the soluble protein in the original solution, which then diffuses to the interface of the evolving gas cell. The localised high temperature and availability of oxygen to catalyse the process then causes the protein to cross link via di-sulphide bridges to form the final permanent partially denatured protein layer. Holding the protein solution at a temperature close to but still below the thermal denaturing point of the protein in free solution also accelerates this process.

The gas bubbles are formed as a protein balloon, with the gas encapsulated by the protein layer. The protein layer gives the gas balloon stability as it has an elastic restoring force that resists compressive or tensile forces in the balloon. This elastic restoring force originates from the cysteine to cysteine crosslinks in the protein layer. The protein layer gives the gas balloon similar physical properties to, and mimics the behaviour of, a fat or oil particle. The interface is designed, according to the protein system being used, to force the cross linking at the interface. During processing, the bubble formation and aggregation kinetics are controlled to trap the air filled emulsion without damage to the structure.

The gas bubble structure results in gas bubbles with long term storage stability, particularly resistance to ripening caused by air that is partially soluble in the continuous phase migrating through the continuous phase to air bubbles, resulting in gas bubble growth.

In certain embodiments of the invention the gas bubbles will replace at least 20 wt % of the fat content in the food product, at least 50 wt % of the fat content or at least 75% of the fat content in the food product.

In certain embodiments the oil droplets and gas bubbles (or at least 95% of them) have a diameter of 5 µm or less, or even 3 µm or less. In certain embodiments the gas bubbles have a diameter of 1 µm or more.

In certain embodiments the diameter of the gas bubbles and oil droplets is approximately the same.

In certain embodiments the ratio volume ratio of oil droplets to gas bubbles is from 1.2:1 to 1:1.2 and in certain of these embodiments is about 1:1

The invention has produced a microstructure where the oil and air cells are of similar size and are intimately mixed within an aqueous continuum rather than within an aqueous phase itself distributed within an oil phase as shown in WO 00/038547. The invention results in limited contact between the oil phase and gas bubbles thereby restricting the anti-foam effect of the oil.

Tribological analysis of the air filled emulsion and of triphasic emulsions made with the air cells shows a lowering of the frictional resistance of the solution in a thin film rheological context and supports the claim that the air droplets are accurately mimicking oil cells in either the air filled or triphasic emulsions.

The protein may be derived from animals or vegetable matter. Examples of the former include albumin (e.g. lactoglobulin, whey powder, ovalbumin, zein and bovine serum albumin). An example of the latter is zein (wheat). In certain embodiments the protein is a food grade protein approved for human use in at least one of the UK, EU and/or USA.

The nature of the liquid oil is not particularly limited. Suitable triglyceride oils include sunflower oil, soybean oil, rapeseed oil, cottonseed oil, olive oil, corn oil, groundnut oil and mixtures thereof. As referred to herein "liquid" relates to the state of the oil at 20° C.

The food product may be for example a dressing (e.g. mayonnaise), a sandwich spread, a soft cheese, a sauce, a dip, a topping or a dessert.

According to a further aspect of the present invention, there is provided a method of forming an aqueous dispersion of protein coated gas bubbles suitable for forming a food product of the first aspect of the invention comprising:

dissolving a protein capable of forming coated gas bubbles in water with stirring, sonicating the protein solution at a temperature below but within 6° C. of the protein's denaturation temperature in the presence of oxygen, and controlling the temperature within these limits, and separating any protein debris from the resultant dispersion of protein coated gas bubbles.

In certain embodiments of the invention the method further comprises a prior heat treatment of the dry protein to improve the yield and quality of the bubbles. The prior heat treatment may be carried out for a period of 2 to 4 days (for example 3 days) at a temperature of 65 to 75° C. (for example about 70° C.).

With development of processing equipment it is envisaged that sonication of the protein solution could be carried out with membranes.

In certain embodiments, the protein solution is maintained at a pH in the range of 4 to 6 or 4.5 to 5.5. In a specific embodiment the pH is maintained at about 5.

The combination of protein solution at the appropriate pH in the presence of oxygen during sonication yields sufficient air cells for food applications. These cells can then be harvested and concentrated to produce a commodity product which may then be added directly to existing oil/water emulsions to replace their lipid content without affecting their physical or storage properties. Thus the invention also resides in a method of forming a food product comprising mixing the dispersion of the second aspect with an oil-in-water emulsion.

The invention will be further described by way of example only.

BSA-Microbubbles Solution Preparation

Lyophilised bovine serum albumin (fraction V), (BSA), was purchased from Sigma Chemical Co and stored in a refrigerator ca. 4° C. The BSA was then weighed and dissolved in 10 mM aqueous buffer (pH 5) by magnetic stirring at room temperature. Buffer was prepared by mixing an appropriate volume of 10 mM sodium acetate trihydrate and 10 mM acetic acid (both analytical grade). In alternative embodiments the BSA is dissolved in distilled water (pH 5). In further alternative embodiments, the BSA is heat treated at a temperature of 70° C. for a period of 3 days prior to use.

BSA-microbubbles solution was prepared by ultrasonic irradiation of 50 ml of 5% w/v BSA (otherwise indicated), with a high-intensity ultrasonic probe (VCX 750, Sonic and Materials Inc.). The BSA solution prepared above was placed in a jacketed vessel connected to a temperature unit impeller which is positioned into a water bath. The ultrasound horn was positioned at the air-solution interface and the solution sonicated at 20 kHz, amplitude 50% for 3 min at an initial temperature of 49° C. while adding to it oxygen ca. 25 cm$^3$/min. The temperature was between 49° C. and 54° C. during sonication (as measured by the thermocouple). After the synthesis, the microbubbles solution was centrifuged at 1000 rpm for 3 min in order to concentrate bubbles at the top layer (they have relatively great buoyancy) and, in the meantime, to separate protein debris (bottom phase) from the mixture. However, the middle phase still contains substantial microbubbles. Advantageously, centrifugation concentrates the bubbles into distinguishable layers according to bubble size. Bubbles having a size of 1 to 3 μm had the best shelf life properties.

Post sonication, the air cell volume was approximately 15% with 2 μm average size air cells at about $4 \times 10^8$ cells per millimeter. Harvesting of the persistent bubbles by centrifugation allowed for a much greater phase volume (up to 80%) to be achieved.

Preparation of Food Product

The air cells obtained above were mixed with separately prepared 40% oil oil/water emulsion. The resulting emulsion had a fat content of only 50% of the original emulsion and very comparable properties so as to make the two emulsions indistinguishable. Shelf life studies of the bubble solution and the aerated food product demonstrated negligible ripening of the air cells or air loss from the system even after two months storage.

The invention claimed is:

1. A reduced fat shelf stable food product comprising:—
   a continuous aqueous phase,
   liquid oil droplets dispersed in the continuous aqueous phase, and
   protein coated gas bubbles,
wherein the continuous aqueous phase constitutes from 20% to 80% by volume of the food product and the liquid oil droplets and protein coated gas bubbles are from 0.5 μm to 10 μm in diameter and wherein the protein comprises cysteine amino acid residues, but is not a hydrophobin, and wherein the gas bubbles replace at least 20 wt % of the fat content of the emulsion as compared to the full-fat equivalent of the food product.

2. The food product as claimed in claim 1, wherein the oil droplets and gas bubbles have a diameter of 5 μm or less.

3. The food product as claimed in claim 1, wherein the ratio of oil droplets to gas bubbles is from 1.2:1 to 1:1.2.

4. The food product as claimed in claim 1, wherein the protein is selected from lactoglobulin, whey powder, BSA, ovalbumin and zein.

5. The food product as claimed in claim 1, wherein the diameter of the gas bubbles and oil droplets is substantially the same.

6. The food product as claimed in claim 1, wherein the protein is a food-grade protein.

7. The food product as claimed in claim 1 which is a dressing, sandwich spread, dip, topping, sauce, soft cheese or a dessert.

* * * * *